W. R. STRICKLAND.
RADIATOR SUPPORT.
APPLICATION FILED MAY 2, 1914.
1,251,834.
Patented Jan. 1, 1918.
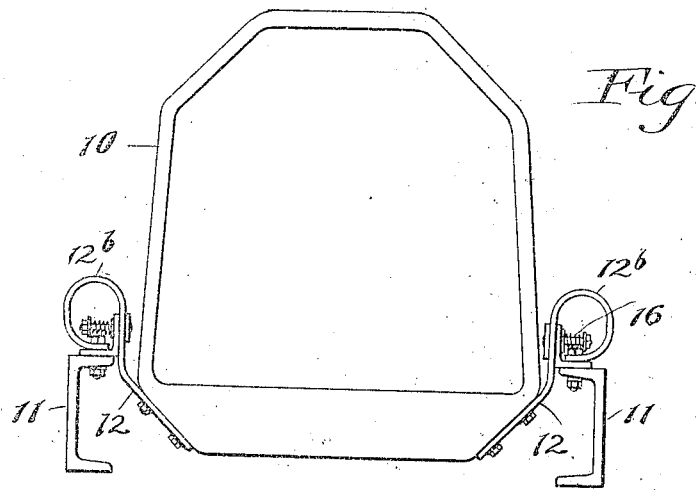
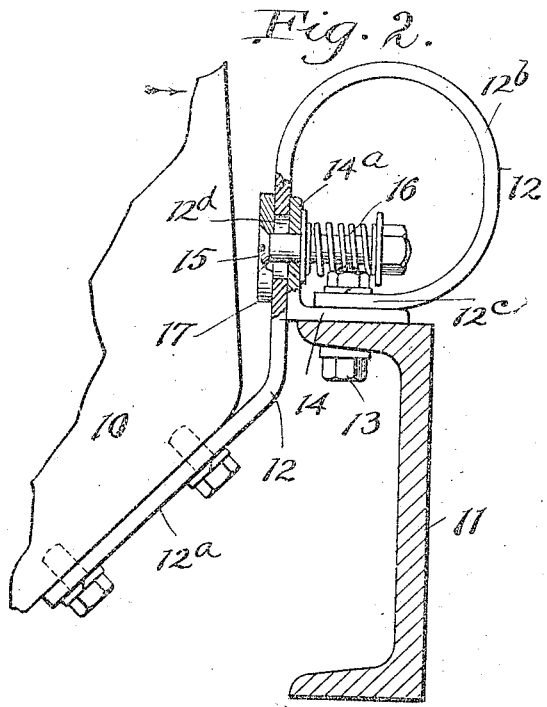
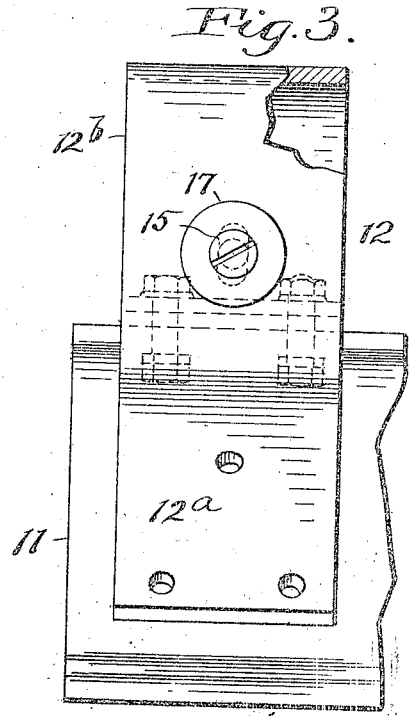
Witnesses
E. B. Gilchrist
L. J. Porter
Inventor
William R. Strickland
by Thurston & Kwis
Attys.

UNITED STATES PATENT OFFICE.

WILLIAM R. STRICKLAND, OF CLEVELAND, OHIO, ASSIGNOR TO THE PEERLESS MOTOR CAR COMPANY, OF CLEVELAND, OHIO, A CORPORATION OF OHIO.

RADIATOR-SUPPORT.

1,251,834.　　　　　　　　Specification of Letters Patent.　　Patented Jan. 1, 1918.

Application filed May 2, 1914. Serial No. 835,834.

*To all whom it may concern:*

Be it known that I, WILLIAM R. STRICK-LAND, a citizen of the United States, residing at Cleveland, in the county of Cuyahoga and State of Ohio, have invented a certain new and useful Improvement in Radiator-Supports, of which the following is a full, clear, and exact description.

This invention relates to radiator supports for motor vehicles, and has for its chief object to provide efficient and simple means for supporting the radiator yieldingly, but in such a manner that the radiator is not subjected to violent or continued oscillations.

My invention may be briefly summarized as consisting in certain novel details of construction and combinations and arrangements of parts which will be described in the specification and set forth in the appended claims.

In the accompanying sheet of drawings, Figure 1 is a front view of the radiator showing the radiator supporting means and chassis frame. Fig. 2 is a view on an enlarged scale showing one of the radiator supports and portions of the radiator and chassis frame. Fig. 3 is a view looking toward the right of Fig. 2 with the radiator removed.

Referring now to the drawings, 10 represents the radiator, and 11 the side bars of the chassis frame, from which the radiator 10 is resiliently supported. The radiator supports or supporting means include two resilient members 12 which connect opposite sides of the radiator to the two side bars of the chassis frame. These members 12 are in the form of straps composed of flat spring or resilient material,—that is, having inherent resiliency. Each of these straps has one of its ends 12ᵃ secured in any suitable manner to the radiator, and from its end 12ᵃ extends upwardly between the radiator and side bar of the chassis frame, where it is formed into a loop, or coil 12ᵇ extending above the chassis frame. The opposite end 12ᶜ of the strap is secured by bolts or equivalent means 13 to the upper flange of the chassis frame member 11. It is the loop 12ᵇ which gives the support or strap its resiliency and enables the radiator to oscillate vertically.

The oscillations, if unrestrained or dampened, would be objectionable, and hence I provide dampening means in connection with each resilient support, and this will now be described. An angle 14 is arranged between the strap 12 and the chassis frame,— this angle having a horizontal flange between the end 12ᶜ of the strap and the flange of the channel member forming the side of the chassis frame, and it has also a vertical inner flange 14ᵃ, the inner face of which is engaged by the upwardly extending part of the spring or strap 12. To dampen the oscillations of the strap 12 and radiator, a bolt 15 is passed through an opening in the vertical flange 14ᵃ of the angle 14, and through an enlarged opening 12ᵈ of the strap. A coil spring 16 which surrounds the shank of the bolt 15, and which is arranged between a nut on the outer end of the bolt 15 and the vertical flange 14 of the angle, yieldingly presses a washer or plate 17 which is provided at the inner end of the bolt against the inner face of the strap 12, and causes the latter to be yieldingly clamped between this washer and the flange 14ᵃ. The tension or stiffness of the spring 16 is such that there is just sufficient friction between the yieldable radiator support 12 and the clamping members 12ᵈ and 14ᵃ that the radiator may oscillate to some extent, but the oscillations are dampened. At the same time the construction admits of a limited lateral movement between the radiator and chassis frame.

This construction answers with high efficiency the requirements of a yieldable radiator support, and at the same time it is inexpensive, simple in construction and durable.

Having thus described my invention, what I claim is:

1. In combination with a chassis frame and radiator, of a motor vehicle, flat springs connecting the radiator to the chassis frame, and means yieldingly slidingly engaging the springs between the radiator and frame to dampen the oscillations thereof.

2. In combination with the chassis frame and radiator of a motor vehicle, flat yieldable members connecting the radiator to the chassis frame, and means frictionally and slidingly engaging said members between the radiator and frame to dampen the oscillations thereof.

3. In combination with the chassis frame and radiator of a motor vehicle, straps secured to the radiator and to the chassis frame provided with loops, and means frictionally and slidingly engaging said straps between the radiator and the frame to dampen the oscillation thereof.

4. In combination with the chassis frame and radiator of a motor vehicle, flat straps provided with loops connecting the radiator to the frame and each secured at one end to the radiator, and at its other end to the frame, and devices supported on the frame and frictionally engaging the straps between their points of connection with the radiator and frame to dampen the oscillations thereof.

5. In combination with the chassis frame and radiator of a motor vehicle, resilient straps connecting the radiator to the chassis frame, a pair of clamping means engaging a portion of each of said straps, and a spring for causing said members to be pressed yieldingly against the opposite sides of the strap.

In testimony whereof, I hereunto affix my signature in the presence of two witnesses.

WILLIAM R. STRICKLAND.

Witnesses:
A. F. KWIS,
E. B. GILCHRIST.